(12) United States Patent
Obara

(10) Patent No.: US 6,186,627 B1
(45) Date of Patent: Feb. 13, 2001

(54) BACK-SURFACE PROGRESSIVE POWER LENS

(75) Inventor: Yoshimi Obara, Tokyo (JP)

(73) Assignee: Asahi Kogaku Kabushiki Kaisha, Tokyo (JP)

( * ) Notice: Under 35 U.S.C. 154(b), the term of this patent shall be extended for 0 days.

(21) Appl. No.: 09/453,036

(22) Filed: Dec. 2, 1999

(30) Foreign Application Priority Data

Dec. 3, 1998 (JP) .................................................. 10-344364

(51) Int. Cl.⁷ .................................................. G02C 7/06
(52) U.S. Cl. .................................................. 351/169
(58) Field of Search .................................. 351/168, 169, 351/170, 171, 172, 177

(56) References Cited

U.S. PATENT DOCUMENTS

| | | | |
|---|---|---|---|
| 4,906,090 | * 3/1990 | Barth | 351/169 |
| 4,950,057 | * 8/1990 | Shirayanagi | 351/169 |
| 4,955,712 | * 9/1990 | Barth et al. | 351/169 |
| 5,719,657 | 2/1998 | Izawa et al. | 351/169 |

\* cited by examiner

*Primary Examiner*—Scott J. Sugarman
(74) *Attorney, Agent, or Firm*—Greenblum & Bernstein, P.L.C.

(57) ABSTRACT

A back-surface progressive power lens is provided having a negative dioptric power for distance vision, the value of a surface power $Pf_m$ of the progressive surface in the main meridional plane at a first point on the main meridian in a distance portion of the progressive power lens is less than the value of a surface power $Pf_s$ of the progressive surface in a plane perpendicular to the main meridional plane at the first point; and the value of a surface power $Pn_m$ of the progressive surface in the main meridional plane at a second point on the main meridian in a near portion of the progressive power lens is greater than the value of a surface power $Pn_s$ of the progressive surface in a plane perpendicular to the main meridional plane at the second point. The surface power P is defined by the following condition: $P=(n-1)/r$; wherein "n" represents the refractive index of the progressive power lens, and "r" represents the radius of curvature at one of the first point and the second point on the main meridian in the near portion and the distance portion, respectively.

7 Claims, 4 Drawing Sheets

BACK-SURFACE PROGRESSIVE POWER LENS

BACKGROUND OF THE INVENTION

1. Field of the Invention

The present invention relates to a progressive power lens wherein the dioptric power for distance vision is negative and a progressive surface is formed on the back surface thereof.

2. Description of the Related Art

Progressive power lenses which are utilized as spectacle lenses are known as lenses having a distance portion positioned on upper part of the lens, a near portion positioned on lower part of the lens, and an intermediate portion positioned between the near and distance portions with a continuous change of dioptric power from the near portion to the distance portion.

In such progressive power lenses, although the surface power of the distance portion and the surface power of the near portion are naturally different from each other, in the past, the surface power at a certain point on the main meridian in the main meridional plane was identical to the surface power at that same point in a plane perpendicular to the main meridional plane, in view of facilitating ease of manufacture thereof. In recent progressive power lenses, due to advancement in production technology, the surface power at a certain point in the plane perpendicular to the main meridional plane can be easily made different from the surface power at the certain point in the main meridional plane. Consequently, there have been various proposals made for the surface power for such progressive power lenses.

It is desirable, mainly from a cosmetic point of view, for progressive power spectacle lenses, and also any other types of spectacle lenses, to be formed (manufactured) as thin as possible. A spectacle lens can be thinned without changing the power thereof by employing a gentle base curve. However, if a gentle base curve is adopted for the purpose of thinning a progressive power lens, it is difficult to correct aberrations, particularly astigmatism. Due to this reason, an appropriate base curve is selected taking into account the correction for aberrations. However, due to such a conventional approach, the thickness of the progressive power lens cannot be made sufficiently small.

SUMMARY OF THE INVENTION

It is an object of the present invention to provide a back-surface progressive power lens having a progressive surface on the back surface thereof, wherein both the reduction of the thickness and the correction for aberrations can be achieved in a balanced combination.

The inventor of the present invention has discovered that, in a back-surface progressive power lens, if the surface power in the main meridional plane is stronger than that in a plane perpendicular to the main meridional plane (the sagittal plane) in the distance portion and if the surface power in the main meridional plane is weaker than that in the sagittal plane in the near portion, a balanced combination of the reduction of the thickness and the correction for aberrations can be achieved, particularly in a progressive power lens wherein the dioptric power for distance vision thereof is negative.

Namely, according to an aspect of the present invention, a progressive power lens is provided having a negative dioptric power for distance vision, wherein a progressive surface is formed on the back surface of the progressive power lens. The value of a surface power $Pf_m$ of the progressive surface in the main meridional plane at a first point on the main meridian in a distance portion of the progressive power lens is less than the value of a surface power $Pf_s$ of the progressive surface in a plane perpendicular to the main meridional plane at the first point ($Pf_m < Pf_s$). The value of a surface power $Pn_m$ of the progressive surface in the main meridional plane at a second point on the main meridian in a near portion of the progressive power lens is greater than the value of a surface power $Pn_s$ of the progressive surface in a plane perpendicular to the main meridional plane at the second point ($Pn_m > Pn_s$). The surface power P is defined by the following condition: $P=(n-1)/r$; wherein "n" represents the refractive index of the progressive power lens, and "r" represents the radius of curvature at one of the first point and the second point on the main meridian in the near portion and the distance portion, respectively.

In the conditions described in the specification, "P" generally designates a surface power; "n" and "f" suffixed to "P" designates the near portion and the distance portion, respectively; and "$_m$" and "$_s$" suffixed to "n" or "f" designate the meridional plane and the sagittal plane (a plane perpendicular to the meridional plane), respectively.

Preferably, the value of the surface power $P_m$ is identical to the value of the surface power $P_s$ at a point in the close vicinity of a specific point on the main meridian at which there is no prismatic power.

Preferably, the value $S_N$ of a dioptric power for near vision is negative ($S_N < 0$), and wherein the following relationship exists at a point within the near portion:

$$Pn_m(-20) - Pn_s(-20) > 0.1;$$

wherein $Pn_m(-20)$ represents the surface power in the main meridional plane at a point, on the main meridian, 20 mm downward from a prism reference point of the progressive power lens in the near portion; and $Pn_s(-20)$ represents the surface power at a point, on the main meridian in a plane perpendicular to the main meridional plane, 20 mm downward from the prism reference point of the progressive power lens in the near portion.

With this relationship, a good field of view can be obtained throughout the entire near portion.

Preferably, the value $S_N$ of a dioptric power for near vision is greater than or equal to zero ($S_N \geq 0$), and the following relationship exists at a point within the near portion: $Pn_m(-20) - Pn_s(-20) > 0.2$; wherein $Pn_m(-20)$ represents the surface power in the main meridional plane at a point, on the main meridian, 20 mm downward from a prism reference point of the progressive power lens in the near portion; and $Pn_s(-20)$ represents the surface power at a point, on the main meridian, in a plane perpendicular to the main meridional plane, 20 mm downward from the prism reference point of the progressive power lens in the near portion.

At the point 20 mm downward from the prism reference point, a constant effect in the correction for astigmatism can be obtained if the value of "$Pn_m - Pn_s$" is greater than zero ($Pn_m - Pn_s > 0$) in the case where the value $S_N$ of the dioptric power for near vision is equal to or greater than zero ($S_N \geq 0$). It is preferable that the value of "$Pn_m - Pn_s$" is greater than 0.2 ($Pn_m - Pn_s > 0.2$) to obtain a sufficient effect in the correction for astigmatism.

Preferably, the value $S_F$ of a dioptric power for distance vision is defined by the following condition:

$$-2 \leq S_F < 0;$$

and wherein the following relation exists at a point within the distance portion:

$$Pf_m(15) - Pf_s(15) < -0.1;$$

wherein $Pf_m(15)$ represents the surface power in the main meridional plane at a point, on the main meridian, 15 mm upward from a prism reference point of the progressive power lens in the distance portion, and $Pf_s(15)$ represents the surface power at a point, on the main meridian in a plane perpendicular to the main meridional plane, 15 mm upward from the prism reference point of the progressive power lens in the distance portion.

Preferably, the following condition is satisfied:

$$-2 \leq S_F \leq -1.$$

It is usually necessary to increase the amount of correction for aberrations as the value $S_F$ of the dioptric power for distance vision decreases in the case where the value $S_F$ of the dioptric power for distance vision is negative. In the case of "$-2 \leq S_F \leq 0$", a sufficient effect cannot be obtained if the value of "$Pf_m - Pf_s$" at the point 15 mm upward from the prism reference point is larger than $-0.1$. Preferably, "$Pf_m - Pf_s$" is greater than 0.1, especially in the case of "$-2 \leq S_F \leq -1$".

Preferably, the value $S_F$ of a dioptric power for distance vision is defined by the following condition:

$$-6 < S_F < -2;$$

and wherein the following relation exists at a point within the distance portion:

$$Pf_m(15) - Pf_s(15) < -0.2;$$

wherein $Pf_m(15)$ represents the surface power in the main meridional plane at a point, on the main meridian, 15 mm upward from a prism reference point of the progressive power lens in the distance portion, and $Pf_s(15)$ represents the surface power at a point, on the main meridian in a plane perpendicular to the main meridional plane, 15 mm upward from the prism reference point of the progressive power lens in the distance portion.

If the above condition "$-6 < S_F < -2$" is satisfied, a sufficient effect in the correction for astigmatism cannot be obtained unless the value of "$Pf_m - Pf_s$" at the point 15 mm upward from the prism reference point is less than $-0.2$ ($Pf_m - Pf_s < -0.2$).

According to another aspect of the present invention, a progressive power lens is provided having a negative dioptric power for distance vision, wherein a progressive surface is formed on the back surface of the progressive power lens. A surface power $P_m$ of the progressive surface in the main meridional plane at a point on the main meridian and a surface power $P_s$ of the progressive surface in a plane perpendicular to the main meridional plane at the point on the main meridian satisfy the following condition:

$$\Delta P(15) - \Delta P(-20) < -0.3;$$

wherein $\Delta P = Pm - Ps$ and $\Delta P(15)$ represents the difference between surface powers $P_m$ and $P_s$ at a point 15 mm upward from a prism reference point of the progressive power lens, and $\Delta P(-20)$ represents the difference between surface powers $P_m$ and $P_s$ at a point 20 mm downward from the prism reference point of the progressive power lens.

If this condition is not satisfied (unless the difference between the surface powers $P_m$ and $P_s$ at the point 15 mm upward from the prism reference point and the difference between the surface powers $P_m$ and $P_s$ at the point 20 mm downward from the prism reference point is greater than $-0.3$), the aberration cannot be effectively corrected in the distance portion or the near portion.

It is preferable that the present invention be applied to the back-surface progressive power lens whose addition power (ADD) is in the range of 0.5 to 4. A back-surface progressive power lens whose addition power is less than 0.5 has no or little aberration by nature.

Conversely, in the case of the back-surface progressive power lens whose addition power is more than 4, not only the difference in dioptric power between the distance portion and the near portion is large but also the amount of aberrations to be corrected is large, which raises a problem in the manufacture of such a lens. Accordingly, it is preferable that the addition power is equal to or less than three (ADD$\leq$3). Furthermore, it is preferable that the value $S_N$ of the dioptric power for near vision be less than negative one ($S_N < -1$). This is because the aberrations in the near portion is originally small if the value $S_N$ of the dioptric power for near vision is approximately zero, so that in this case no significant aberration correction is expected.

Consequently, a most significant aberration correction is expected if the following two conditions are satisfied:

$$0.5 \leq ADD \leq 3.0, S_N < -1.$$

The present disclosure relates to subject matter contained in Japanese Patent Application No.10-344364 (filed on Dec. 3, 1998) which is expressly incorporated herein by reference in its entirety.

BRIEF DESCRIPTION OF THE DRAWINGS

The present invention will be described below in detail with reference to the accompanying drawings in which.

DESCRIPTION OF THE PREFERRED EMBODIMENTS

Figure 2:
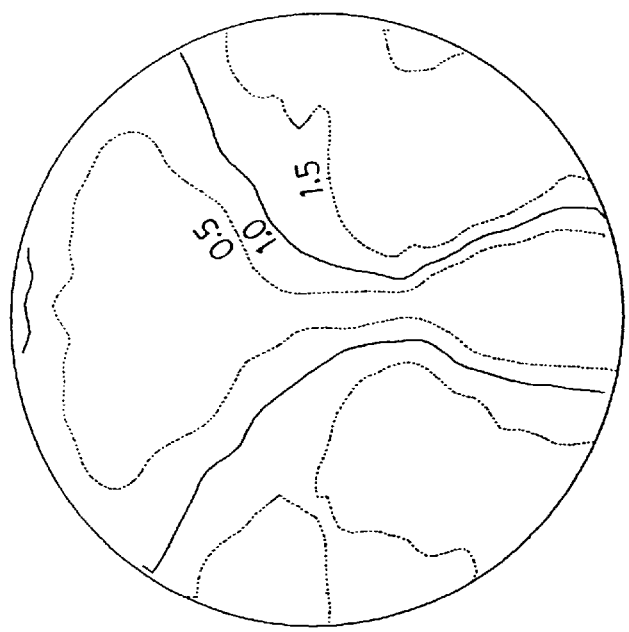
FIG. 2 is a chart illustrating the distribution of astigmatism in the lens shown in FIG. 1.
Figure 1:
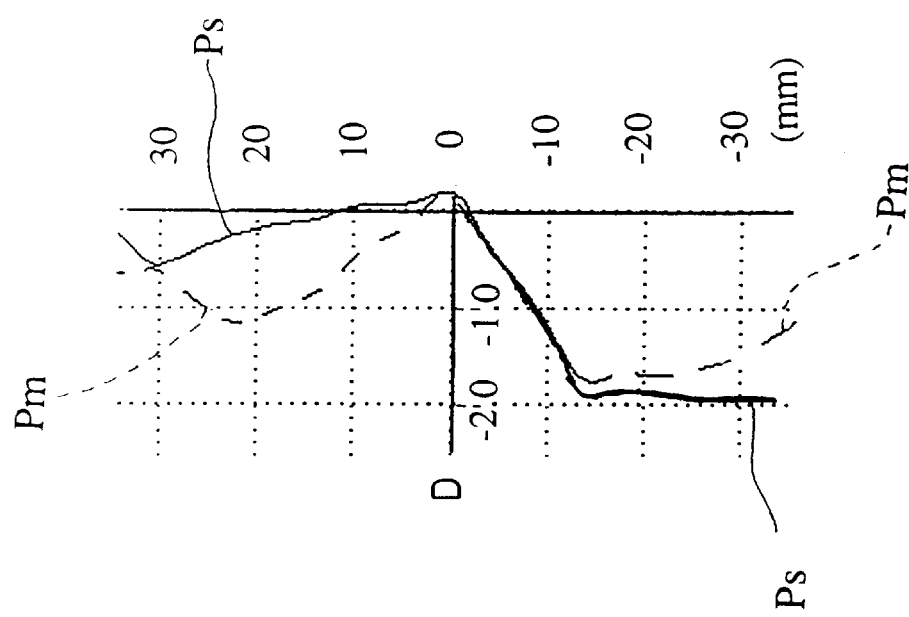
FIG. 1 is a graph showing the distribution of the surface power at points along the main meridian for the main meridional and sagittal planes, in the first embodiment of a back-surface progressive power lens to which the present invention is applied.
Figure 4:
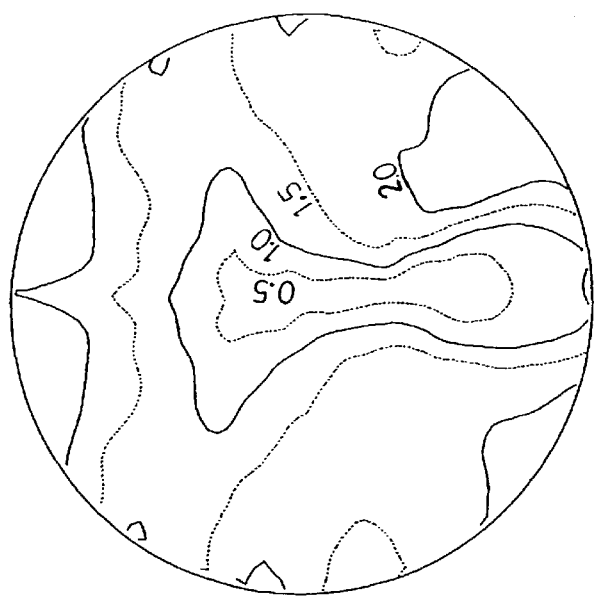
FIG. 4 is a chart illustrating the distribution of astigmatism in the lens shown in FIG. 3.
Figure 3:
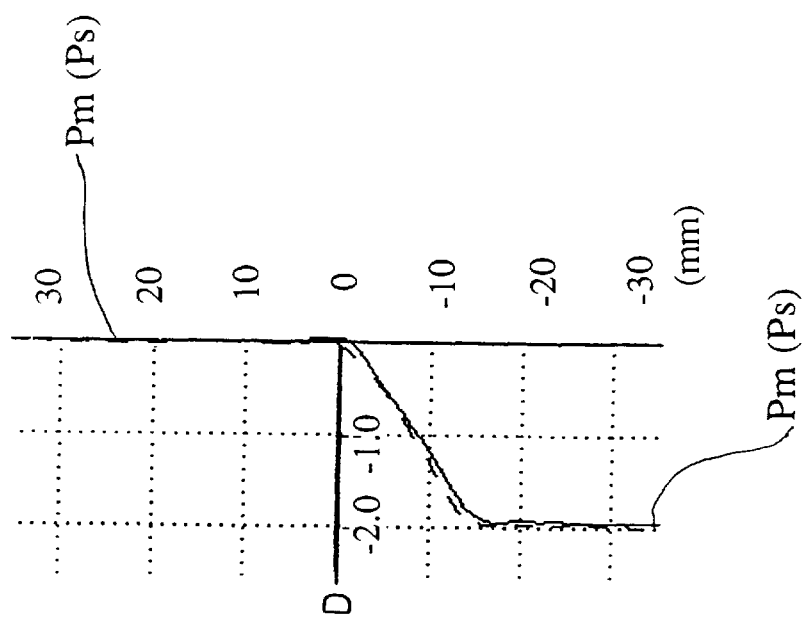
FIG. 3 is a graph, showing the distribution of the surface power at points along the main meridian, in comparison with the first embodiment shown in FIG. 1, wherein the surface power for the main meridional plane is identical to the surface power for the sagittal plane at a given point thereon.

FIGS. 1 and 2 show the first embodiment of a back-surface progressive power lens for spectacles. FIGS. 3 and 4 show a comparative example of a back-surface progressive power lens with respect to the first embodiment. The distribution of the surface power at points along the main meridian shown in FIGS. 1, 3, 5 and 7 are shown as relative values with respect to a reference surface power. In FIGS. 1 and 3, the reference surface power is 6 (P=6), and in FIGS. 5 and 7, the reference surface power is 4 (P=4). For example, values −1, −2 and 0 in FIGS. 1, and 3, mean P=5, 4 and 6 respectively while in FIGS. 5 and 7 these values mean P=3, 2 and 4, respectively.

The first embodiment is applied to a back-surface progressive power lens for spectacles, in which the dioptric power for distance vision SPH (=$S_F$), the addition power ADD (=$S_N$−$S_F$) and the base curve D1 are −4.00, 2.00 and 2.0, respectively; i.e., the dioptric power of the distance portion and the dioptric power of the near portion are −4D and −2D, respectively. This lens has a progressive surface on the back surface thereof.

FIG. 1 shows the distribution of the surface power at points along the main meridian for the main meridional plane and the plane perpendicular to the main meridional plane, in the first embodiment of the back-surface progressive power lens. As can be clearly understood from FIG. 1, in the first embodiment, the surface power $P_m$ (dotted line) in the main meridional plane is less than the surface power $P_s$ (solid line) in the plane perpendicular to the main meridional plane in the distance portion (positive (+) area in the ordinate direction), whereas the surface power $P_s$ (solid line) in the plane perpendicular to the main meridional plane is less than the surface power $P_m$ in the main meridional plane (dotted line) in the near portion (negative (−) areas in the ordinate direction); i.e., $Pf_m < Pf_s$ in the distance portion, and $Pn_m > Pn_s$ in the near portion. The curve (dotted line) showing the distribution of the surface power $P_m$ intersects the curve (solid line) showing the distribution of the surface power $P_s$ only at one point in the vicinity of the specific point at which there is no prismatic power, i.e., at which the incident light passes through without being refracted so that the values of the surface powers $P_m$ and $P_s$ are identical to each other at the point of intersection.

Namely, the absolute value of the surface power $P_m$ is greater than the absolute value of the surface power $P_s$ in the distance portion, and is less than the absolute value of the surface power $P_s$ in the near portion; and the values of the surface powers $P_m$ and $P_s$ are the same at one point in the vicinity of the specific point at which there is no prismatic power.

Note that in FIGS. 1 and 3, the surface power at the intersecting point (at which the value of the surface power $P_m$ is identical to the value of the surface power $P_s$) in the intermediate portion is a reference value (=0).

FIG. 2 shows the distribution of astigmatism of the first embodiment of the back-surface progressive power lens.

FIG. 3 is a graph, showing the distribution of the surface power at points along the main meridian, in comparison with the first embodiment shown in FIG. 1, wherein the surface power for the main meridional plane is identical to the surface power for the plane perpendicular to the main meridional plane at a given point thereon. The specification (i.e., SPH, ADD and DI) of the lens is the same as that of FIG. 1. The distribution of astigmatism of the lens of FIG. 3 is shown in FIG. 4.

In FIGS. 2 and 4, the astigmatism is indicated at intervals of 0.5D. As can be understood by comparing FIG. 2 with FIG. 4, the astigmatism is effectively corrected in the first embodiment (FIG. 2), in comparison with the comparative example shown in FIG. 4 in which the surface powers in the main meridional plane and the plane perpendicular to the main meridional plane are identical.

Figure 6:
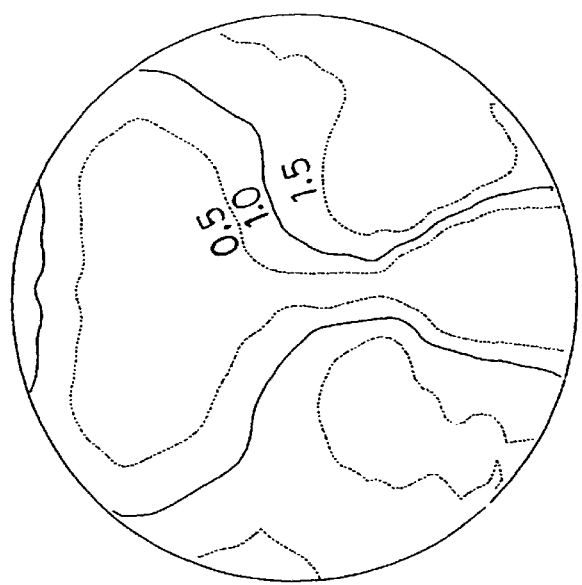
FIG. 6 is a chart illustrating the distribution of astigmatism in the lens shown in FIG. 5.
Figure 5:
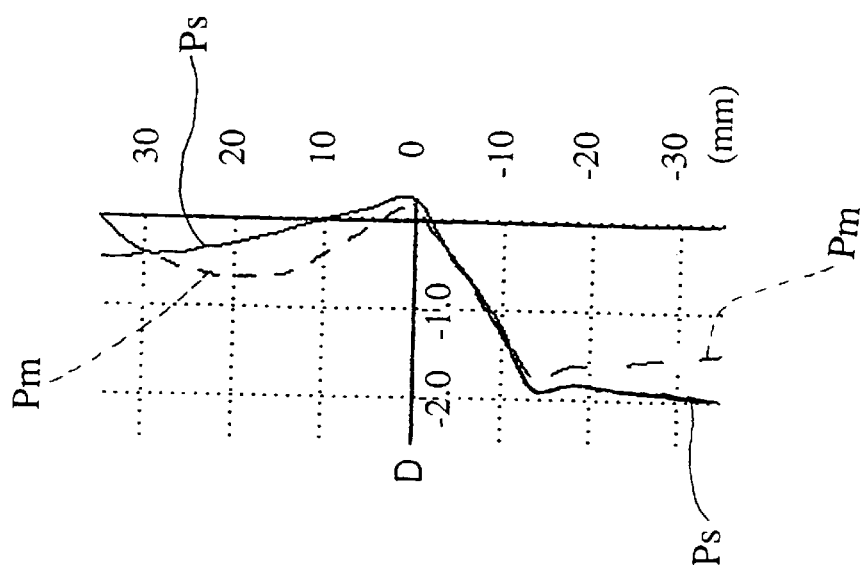
FIG. 5 is a graph showing the distribution of the surface power at points along the main meridian for the main meridional and sagittal planes, in the second embodiment of a back-surface progressive power lens to which the present invention is applied.
Figure 8:
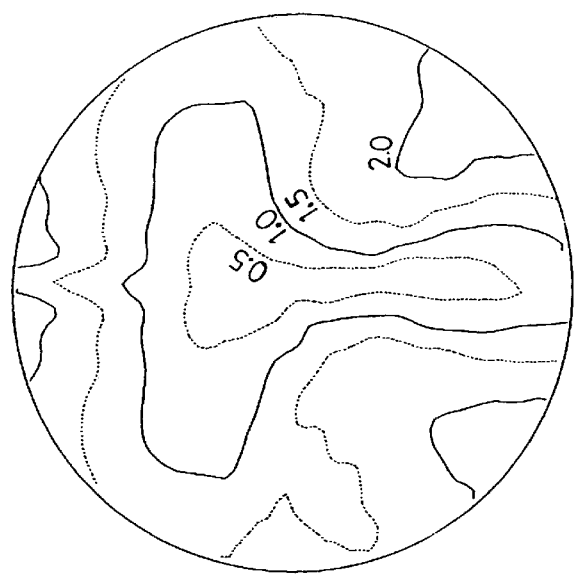
FIG. 8 is a chart illustrating the distribution of astigmatism in the lens shown in FIG. 7.
Figure 7:
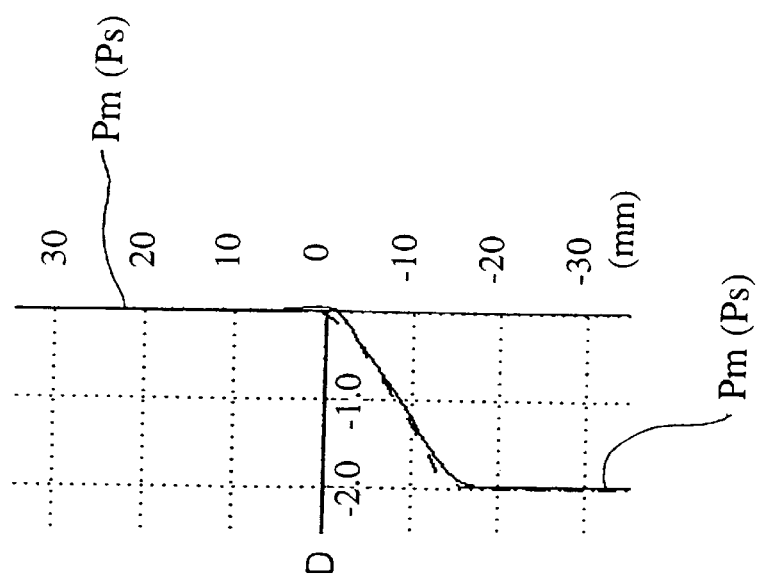
FIG. 7 is a graph showing the distribution of the surface power at points along the main meridian, in comparison with the second embodiment shown in FIG. 5, wherein the surface power for the main meridional plane is identical to the surface power for the sagittal plane at a given point thereon.

FIGS. 5 and 6 show the second embodiment of a back-surface progressive power lens for spectacles. FIGS. 7 and 8 show a comparative example of a back-surface progressive power lens with respect to the second embodiment. The second embodiment is applied to a back-surface progressive power lens for spectacles, in which the dioptric power for distance vision SPH (=$S_F$), the addition power ADD (=$S_N$−$S_F$) and the base curve D1 are −2.00, 2.00 and 2.0, respectively, i.e., the dioptric power of the distance portion and the dioptric power of the near portion are −2D and 0D, respectively. This lens has a progressive surface on the back surface thereof.

FIG. 5 shows the distribution of the surface power at points along the main meridian for the main meridional and the plane perpendicular to the main meridional plane, in the second embodiment of the back-surface progressive power lens. As can be clearly understood from FIG. 5, similar to the first embodiment, the surface power $P_m$ (dotted line) in the main meridional plane is less than the surface power $P_s$ (solid line) in the plane perpendicular to the main meridional plane in the distance portion (positive (+) area in the ordinate direction), whereas the surface power $P_s$ (solid line) in the plane perpendicular to the main meridional plane is less than the surface power $P_m$ in the main meridional plane (dotted line) in the near portion (negative (−) areas in the ordinate direction); i.e., $Pf_m < Pf_s$ in the distance portion, and $Pn_m > Pn_s$ in the near portion. The curve (dotted line) showing the distribution of the surface power $P_m$ in the main meridional plane intersects the curve (solid line) showing the distribution of the surface power $P_s$ in the plane perpendicular to the main meridional plane only at one point in the close vicinity of the specific point at which there is no prismatic power, i.e., at which the incident light passes through without being refracted so that the values of the surface powers $P_m$ and $P_s$ are identical to each other at the point of intersection.

FIG. 6 shows the distribution of astigmatism of the second embodiment of the back-surface progressive power lens.

FIG. 7 shows the distribution of the surface power at points along the main meridian wherein the surface power for the main meridional plane is identical to the surface power for the plane perpendicular to the main meridional plane at a given point, in comparison with the second embodiment shown in FIG. 5. The specification (i.e., SPH, ADD and DI) of the lens is the same as that in FIG. 5. The distribution of astigmatism of the lens of FIG. 7 is shown in FIG. 8.

In FIGS. 6 and 8, similar to FIGS. 2 and 4, the astigmatism is indicated at an intervals of 0.5D. As can be understood by comparing FIG. 6 with FIG. 8, the astigmatism is effectively corrected in the second embodiment, in comparison with the comparative example shown in FIG. 8 in which the surface powers in the main meridional plane and the sagittal plane are identical.

Table 1 below shows numerical values of the first and second embodiments. Each of the first and second embodiments satisfies the conditions defined by the corresponding conditions mentioned above.

TABLE 1

| | $Pn_m$ (−20)−$Pn_s$ (−20) | $Pf_m$ (15)−$Pf_s$ (15) | ΔP (15)−ΔP (−20) |
|---|---|---|---|
| First Embodiment: | 0.19 | −0.80 | −0.99 |
| Second Embodiment: | 0.23 | −0.49 | −0.72 |

As can be understood from the above discussion, according to the embodiments to which the present invention is applied, not only can the lens thickness be reduced but also the aberrations can be effectively corrected particularly in a progressive power lens in which the distance portion has a negative power. Moreover, since a progressive power surface is formed on the back surface of the lens, the lens has less distortion and a larger bright-field than front-surface progressive power lens. Furthermore, the front surface of the lens is generally formed as a spherical surface, which is cosmetically advantageous to improve the appearance of the lens.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A progressive power lens having a negative dioptric power for distance vision, wherein a progressive surface is formed on the back surface of said progressive power lens;

wherein the value of a surface power $Pf_m$ of said progressive surface in the main meridional plane at a first point on the main meridian in a distance portion of said progressive power lens is less than the value of a surface power $Pf_s$ of said progressive surface in a plane perpendicular to said main meridional plane at said first point ($Pf_m < Pf_s$);

wherein the value of a surface power $Pn_m$ of said progressive surface in said main meridional plane at a second point on said main meridian in a near portion of said progressive power lens is greater than the value of a surface power $Pn_s$ of said progressive surface in a plane perpendicular to said main meridional plane at said second point ($Pn_m > Pn_s$); and wherein said surface power P is defined by the following condition:

$P = (n-1)/r;$ wherein "n" represents the refractive index of said progressive power lens; and "r" represents the radius of curvature at one of said first point and said second point on said main meridian in said near portion and said distance portion, respectively.

2. The progressive power lens according to claim 1, wherein the value of said surface power $P_m$ is identical to the value of said surface power $P_s$ at a point in the close vicinity of a specific point on said main meridian at which there is no prismatic power.

3. The progressive power lens according to claim 1, wherein the value $S_N$ of a dioptric power for near vision is negative ($S_N < 0$), and wherein the following relationship exists at a point within said near portion;

$Pn_m(-20) - Pn_s(-20) > 0.1;$ wherein $Pn_m(-20)$ represents the surface power in the main meridional plane at a point, on said main meridian, 20 mm downward from a prism reference point of said progressive power lens in said near portion; and $Pns(-20)$ represents the surface power at a point, on said main meridian in a plane perpendicular to said main meridional plane, 20 mm downward from said prism reference point of said progressive power lens in said near portion.

4. The progressive power lens according to claim 1, wherein the value $S_N$ of a dioptric power for near vision is greater than or equal to zero ($S_N \geq 0$), and wherein the following relationship exists at a point within said near portion:

$Pn_m(-20) - Pn_s(-20) > 0.2$ wherein $Pn_m(-20)$ represents the surface power in the main meridional plane at a point, on said main meridian, 20 mm downward from a prism reference point of said progressive power lens in said near portion; and $Pns(-20)$ represents the surface power at a point, on said main meridian, in the plane perpendicular to said main meridional plane, 20 mm downward from said prism reference point of said progressive power lens in said near portion.

5. The progressive power lens according to claim 1, wherein the value $S_F$ of a dioptric power for distance vision is defined by the following condition:

$-2 \leq S_F < 0;$ and wherein the following relation exists at a point within said distance portion:

$Pf_m(15) - Pf_s(15) < -0.1;$ wherein $Pf_m(15)$ represents the surface power in the main meridional plane at a point, on the main meridian, 15 mm upward from a prism reference point of said progressive power lens in said distance portion, and $Pf_s(15)$ represents the surface power at a point, on the main meridian in a plane perpendicular to said main meridional plane, 15 mm upward from said prism reference point of said progressive power lens in said distance portion.

6. The progressive power lens according to claim 1, wherein the value $S_F$ of a dioptric power for distance vision is defined by the following condition:

$-6 < S_F < -2;$ and wherein the following relation exists at a point within said distance portion:

$Pf_m(15) - Pf_s(15) < -0.2;$ wherein $Pf_m(15)$ represents the surface power in the main meridional plane at a point, on the main meridian, 15 mm upward from a prism reference point of said progressive power lens in said distance portion, and $Pf_s(15)$ represents the surface power at a point, on the main meridian in the plane perpendicular to said main meridional plane, 15 mm upward from said prism reference point of said progressive power lens in said distance portion.

7. A progressive power lens having a negative dioptric power for distance vision, wherein a progressive surface is formed on the back surface of said progressive power lens;

wherein a surface power $P_m$ of said progressive surface in the main meridional plane at a point on the main meridian and a surface power $P_s$ of said progressive surface in a plane perpendicular to said main meridional plane at said point on said main meridian satisfy the following condition:

$$\Delta P(15) - \Delta P(-20) < -0.3,$$

wherein $\Delta P = P_m - P_s$ wherein $\Delta P(15)$ represents the difference between surface powers $P_m$ and $P_s$ at a point 15 mm upward from a prism reference point of said progressive power lens, and $\Delta P(-20)$ represents the difference between surface powers $P_m$ and $P_s$ at a point 20 mm downward from said prism reference point of said progressive power lens.

* * * * *

UNITED STATES PATENT AND TRADEMARK OFFICE
CERTIFICATE OF CORRECTION

PATENT NO.    : 6,186,627 B1                                              Page 1 of 1
DATED         : February 13, 2001
INVENTOR(S)   : Yoshimi Obara It is certified that error appears in the above-identified patent and that said Letters Patent is hereby corrected as shown below:

<u>Title page,</u>
Item [73], "Asahi Kogaku Kabushiki Kaisha, Tokyo (JP)" should be
-- Asahi Kogaku Kogyo Kabushiki Kaisha, Tokyo (JP) --

Signed and Sealed this

Thirty-first Day of December, 2002

JAMES E. ROGAN
*Director of the United States Patent and Trademark Office*